United States Patent
Li et al.

(10) Patent No.: US 9,548,771 B2
(45) Date of Patent: Jan. 17, 2017

(54) METHOD AND APPARATUS FOR ELIMINATING INTERFERENCE AMONG TRANSMISSION CHANNELS OF TRANSMITTER

(71) Applicant: Huawei Technologies Co., Ltd., Shenzhen, Guangdong (CN)

(72) Inventors: Xingwen Li, Shanghai (CN); Siqing Ye, Shanghai (CN); Yongsheng Wang, Xi'an (CN); Yan Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/734,464

(22) Filed: Jun. 9, 2015

(65) Prior Publication Data

US 2015/0270857 A1    Sep. 24, 2015

Related U.S. Application Data

(63) Continuation of application No. PCT/CN2013/089130, filed on Dec. 11, 2013.

(30) Foreign Application Priority Data

Dec. 11, 2012 (CN) .......................... 2012 1 0531726

(51) Int. Cl.
*H04B 15/00* (2006.01)
*H04B 1/04* (2006.01)
(Continued)

(52) U.S. Cl.
CPC ............. *H04B 1/0475* (2013.01); *H04L 25/08* (2013.01); *H04L 27/366* (2013.01)

(58) Field of Classification Search
CPC .................. H03F 2201/3233; H03F 2200/336; H03F 2201/3209; H03F 2201/3227; H03F 3/24; H03F 1/3241; H04L 27/368; H04L 27/367; H04B 1/0475; H04B 2001/0425; H04B 15/00
(Continued)

(56) References Cited

U.S. PATENT DOCUMENTS 5,760,646 A * 6/1998 Belcher ................. H03F 1/3229
330/149
5,867,065 A * 2/1999 Leyendecker ........ H03F 1/3247
330/149
(Continued)

FOREIGN PATENT DOCUMENTS

CN 1859031 A 11/2006
CN 1918811 A 2/2007
(Continued)

*Primary Examiner* — Emmanuel Bayard

(57) ABSTRACT

Embodiments of the present invention provide a method and an apparatus for eliminating interference among transmission channels of a transmitter. The method includes: generating a compensation parameter according to an output signal of an analog module on a transmission channel to be processed by the transmitter and an input signal of a digital module on each transmission channel among all transmission channels of the transmitter; generating a cancellation signal according to the compensation parameter and an input or output signal of a digital module on another transmission channel except for the transmission channel to be processed; and performing, according to the cancellation signal, interference elimination processing on the transmission channel to be processed. The method and apparatus according to the embodiments of the present invention avoid an increase of a transmitter product size, and improve an effect of eliminating interference among transmission channels.

12 Claims, 4 Drawing Sheets

(51) Int. Cl.
*H04L 25/08* (2006.01)
*H04L 27/36* (2006.01)

(58) Field of Classification Search
USPC .................................................. 375/295–297
See application file for complete search history.

(56) References Cited

U.S. PATENT DOCUMENTS

| | | | | |
|---|---|---|---|---|
| 6,029,285 A * | 2/2000 | Belcher | H03F 1/3229 | 330/136 |
| 6,141,390 A * | 10/2000 | Cova | H03F 1/3247 | 330/149 |
| 6,462,617 B1 * | 10/2002 | Kim | H03F 1/3247 | 330/149 |
| 6,741,662 B1 * | 5/2004 | Francos | H03F 1/3247 | 375/296 |
| 6,757,525 B1 * | 6/2004 | Ishikawa | H03F 1/3247 | 330/149 |
| 6,998,909 B1 * | 2/2006 | Mauer | H03F 1/3247 | 330/149 |
| 7,024,608 B2 * | 4/2006 | Kurokami | H03F 1/3241 | 329/318 |
| 7,034,612 B2 * | 4/2006 | Kim | H03F 1/3247 | 327/549 |
| 7,269,231 B2 * | 9/2007 | Ding | H03F 1/3247 | 375/284 |
| 7,289,773 B2 * | 10/2007 | Braithwaite | H03F 1/3235 | 375/297 |
| 7,313,199 B2 * | 12/2007 | Gupta | H03F 1/3247 | 375/219 |
| 7,415,252 B2 * | 8/2008 | Jelonnek | H03F 1/3247 | 455/114.2 |
| 7,430,250 B2 * | 9/2008 | Shako | H03F 1/3247 | 375/296 |
| 7,460,613 B2 * | 12/2008 | Sahlman | H03F 1/3247 | 375/296 |
| 7,471,739 B1 * | 12/2008 | Wright | H04L 27/368 | 330/149 |
| 7,479,828 B2 * | 1/2009 | Benedict | H03F 1/3247 | 330/149 |
| 7,535,974 B1 * | 5/2009 | Shirali | H03F 1/3247 | 375/285 |
| 7,551,687 B2 * | 6/2009 | Ode | H03F 1/3247 | 330/149 |
| 7,558,332 B2 * | 7/2009 | Rashev | H03F 1/3211 | 330/278 |
| 7,577,211 B2 * | 8/2009 | Braithwaite | H03F 1/3247 | 375/296 |
| 7,583,754 B2 * | 9/2009 | Liu | H03F 1/3247 | 375/278 |
| 7,613,250 B2 * | 11/2009 | Sasaki | H03F 1/0205 | 375/296 |
| 7,733,177 B1 * | 6/2010 | Borkar | H03F 1/3241 | 330/149 |
| 7,904,033 B1 * | 3/2011 | Wright | H01Q 1/243 | 375/297 |
| 8,019,015 B2 * | 9/2011 | Moffatt | H03F 1/3247 | 375/296 |
| 8,022,763 B2 * | 9/2011 | Maeda | H03F 1/3247 | 330/207 P |
| 8,185,065 B2 * | 5/2012 | McCallister | H03F 1/3247 | 375/296 |
| 8,229,025 B1 * | 7/2012 | Summerfield | H04L 27/368 | 375/285 |
| 8,344,800 B2 * | 1/2013 | Baik | H04B 7/15585 | 330/149 |
| 8,432,220 B2 * | 4/2013 | Peyresoubes | H03F 1/3258 | 330/149 |
| 8,461,925 B2 * | 6/2013 | Matsubara | H03F 1/3247 | 330/149 |
| 8,489,043 B2 * | 7/2013 | Jo | H03F 1/26 | 375/296 |
| 8,548,403 B2 * | 10/2013 | Kim | H03F 1/3247 | 455/114.3 |
| 8,620,233 B2 * | 12/2013 | Brobston | H03F 1/3247 | 330/107 |
| 8,649,743 B2 * | 2/2014 | McCallister | H03F 1/3247 | 330/136 |
| 8,649,745 B2 * | 2/2014 | Bai | H03F 3/245 | 375/295 |
| 8,670,501 B2 * | 3/2014 | Mujica | H03F 1/3247 | 327/291 |
| 8,737,526 B2 * | 5/2014 | Coan | H03F 1/3247 | 375/295 |
| 8,787,494 B2 * | 7/2014 | Bai | H03F 1/3258 | 327/291 |
| 8,811,532 B2 * | 8/2014 | Bai | H03F 1/3247 | 330/149 |
| 8,824,980 B2 * | 9/2014 | McLaurin | H03F 1/3247 | 375/296 |
| 8,933,752 B2 * | 1/2015 | Nagatani | H03F 1/3247 | 330/149 |
| 8,948,303 B1 * | 2/2015 | Van Cai | H04L 27/2624 | 375/296 |
| 8,989,307 B2 * | 3/2015 | Zhou | H03F 1/3247 | 330/291 |
| 9,014,241 B2 * | 4/2015 | Dick | H03F 1/3247 | 375/219 |
| 9,048,797 B2 * | 6/2015 | Kim | H03F 1/3247 | |
| 9,106,188 B2 * | 8/2015 | Tanio | H03F 1/0211 | |
| 9,184,710 B2 * | 11/2015 | Braithwaite | H03F 1/3247 | |
| 2002/0171485 A1 * | 11/2002 | Cova | H03F 1/3247 | 330/149 |
| 2003/0058959 A1 * | 3/2003 | Rafie | H03F 1/3247 | 375/296 |
| 2005/0143025 A1 * | 6/2005 | Suzuki | H04B 1/0475 | 455/114.3 |
| 2006/0008027 A1 * | 1/2006 | Gao | H03F 1/3241 | 375/297 |
| 2006/0039498 A1 * | 2/2006 | de Figueiredo | H03F 1/3241 | 375/297 |
| 2008/0130788 A1 * | 6/2008 | Copeland | H03F 1/3247 | 375/297 |
| 2008/0285640 A1 * | 11/2008 | McCallister | H04L 25/03044 | 375/233 |
| 2009/0256630 A1 * | 10/2009 | Brobston | H03F 1/3247 | 330/2 |
| 2009/0310705 A1 * | 12/2009 | Fujimoto | H03F 1/0211 | 375/296 |
| 2010/0093290 A1 * | 4/2010 | van Zelm | H03F 1/3247 | 455/126 |
| 2010/0271123 A1 * | 10/2010 | Forrester | H03F 1/3247 | 330/149 |
| 2010/0323641 A1 * | 12/2010 | Aparin | H03F 1/34 | 455/114.3 |
| 2011/0256857 A1 * | 10/2011 | Chen | H04B 1/525 | 455/422.1 |
| 2013/0142284 A1 * | 6/2013 | Asensio | H03F 1/3241 | 375/316 |
| 2014/0133526 A1 * | 5/2014 | Camuffo | H03F 1/0233 | 375/219 |
| 2015/0171815 A1 * | 6/2015 | Maxim | H03G 3/3042 | 455/127.2 |
| 2015/0236730 A1 * | 8/2015 | Zhao | H04B 1/0475 | 375/296 |

FOREIGN PATENT DOCUMENTS

| | | |
|---|---|---|
| CN | 102237906 A | 11/2011 |
| CN | 103001900 A | 3/2013 |
| EP | 2 299 774 A1 | 3/2011 |
| EP | 2 503 704 A1 | 9/2012 |
| WO | WO 2007/068722 A1 | 6/2007 |

* cited by examiner

METHOD AND APPARATUS FOR ELIMINATING INTERFERENCE AMONG TRANSMISSION CHANNELS OF TRANSMITTER

CROSS-REFERENCE TO RELATED APPLICATIONS

This application is a continuation of International Application No. PCT/CN2013/089130, filed on Dec. 11, 2013, which claims priority to Chinese Patent Application No. 201210531726.9, filed on Dec. 11, 2012, both of which are incorporated herein by reference in their entireties.

TECHNICAL FIELD

Embodiments of the present invention relate to communications technologies, and in particular, to a method and an apparatus for eliminating interference among transmission channels of a transmitter.

BACKGROUND

With the development of wireless communications technologies, to improve an information transmission rate, a multiple-input multiple-output antenna technology also develops rapidly.

In a transmitter in which multiple transmission channels are arranged, interference often exists among the multiple transmission channels, which affects a transmission effect. To reduce the interference among transmission channels, in the prior art, a space size among transmission channels is increased by means of space shielding; in addition, to meet a requirement of an isolation degree, a physical means such as a screw or a conductive adhesive tape further needs to be arranged between the transmission channels, to implement physical isolation. The increase of the space size and the arrangement of a physical isolation element between the transmission channels increase a transmitter product size.

SUMMARY

Embodiments of the present invention provide a method and an apparatus for eliminating interference among transmission channels of a transmitter, so as to avoid an increase of a transmitter product size caused by an increase of a space size and arrangement of physical isolation elements among transmission channels, and improve an effect of eliminating interference among transmission channels.

According to a first aspect, an embodiment of the present invention provides a method for eliminating interference among transmission channels of a transmitter, including:

generating a compensation parameter according to an output signal of an analog module on a transmission channel to be processed by the transmitter and an input signal of a digital module on each transmission channel among all transmission channels of the transmitter;

generating a cancellation signal according to the compensation parameter and an input or output signal of a digital module on another transmission channel except for the transmission channel to be processed; and performing, according to the cancellation signal, interference elimination processing on the transmission channel to be processed.

In a first possible implementation manner, the generating a compensation parameter according to an output signal of an analog module on a transmission channel to be processed by the transmitter and an input signal of a digital module on each transmission channel among all transmission channels of the transmitter comprises:

performing analog-to-digital conversion on the output signal of the analog module on the transmission channel to be processed, generating an injected signal according to the analog-to-digital converted signal and input signals of digital modules on the all transmission channels, and generating the compensation parameter according to the input signal of the digital module on each transmission channel among the all transmission channels and the injected signal; and after the generating the injected signal according to the analog-to-digital converted signal and input signals of digital modules on the all transmission channels, the method further includes:

inputting the injected signal to a training sequence pre-constructing submodule of the digital module on the transmission channel to be processed.

In a second possible implementation manner, the performing, according to the cancellation signal, interference elimination processing on the transmission channel to be processed comprises:

combining an output signal of a digital module on the transmission channel to be processed and the cancellation signal, and sending the combined signal to a digital-to-analog converter on the transmission channel to be processed.

In a third possible implementation manner, the performing, according to the cancellation signal, interference elimination processing on the transmission channel to be processed comprises:

combining an input signal of a digital module on the transmission channel to be processed and the cancellation signal, and sending the combined signal to the digital module on the transmission channel to be processed.

According to a second aspect, an embodiment of the present invention provides an apparatus for eliminating interference among transmission channels of a transmitter, including:

a parameter generating unit, configured to generate a compensation parameter according to an output signal of an analog module on a transmission channel to be processed by the transmitter and an input signal of a digital module on each transmission channel among all transmission channels of the transmitter;

a cancellation signal generating unit, connected to the parameter generating unit, and configured to generate a cancellation signal according to the compensation parameter and an input or output signal of a digital module on another transmission channel except for the transmission channel to be processed; and a cancellation processing unit, connected to the cancellation signal generating unit, and configured to perform, according to the cancellation signal, interference elimination processing on the transmission channel to be processed.

In a first possible implementation manner, the parameter generating unit is specifically configured to perform analog-to-digital conversion on the output signal of the analog module on the transmission channel to be processed, generate an injected signal according to the analog-to-digital converted signal and input signals of the digital modules on the all transmission channels, generate the compensation parameter according to the input signal of the digital module on each transmission channel among the all transmission channels and the injected signal, and input the injected signal to a training sequence pre-constructing submodule of a digital module on the transmission channel to be processed.

In a second possible implementation manner, the cancellation processing unit is specifically configured to combine an output signal of a digital module on the transmission channel to be processed and the cancellation signal, and send the combined signal to a digital-to-analog converter on the transmission channel to be processed.

In a third possible implementation manner, the cancellation processing unit is specifically configured to combine an input signal of a digital module on the transmission channel to be processed and the cancellation signal, and send the combined signal to the digital module on the transmission channel to be processed.

In a fourth possible implementation manner, the parameter generating unit includes a parameter generating subunit and a feedback signal collecting subunit; where the feedback signal collecting subunit includes a coupled circuit and an analog-to-digital converter, and an output end of the analog module on the transmission channel to be processed is connected to the parameter generating subunit through the coupled circuit and the analog-to-digital converter.

With reference to the second possible implementation manner of the second aspect, in a fifth possible implementation manner, the cancellation processing unit includes an adder, and the adder respectively connected to an output end of the digital module on the transmission channel to be processed, an output end of the cancellation signal generating unit, and an input end of the digital-to-analog converter.

With reference to the third possible implementation manner of the second aspect, in a sixth possible implementation manner, the cancellation processing unit is an adder, and the adder connects to an input end of the digital module on the transmission channel to be processed.

According to a third aspect, an embodiment of the present invention provides a transmitter, including any one of the foregoing apparatuses for eliminating interference among transmission channels of a transmitter.

According to a fourth aspect, an embodiment of the present invention provides a base station, including the foregoing transmitter.

It can be learned from the foregoing technical solutions that, in a method and apparatus for eliminating interference among transmission channels of a transmitter according to the embodiments of the present invention, the apparatus for eliminating interference among transmission channels of a transmitter generates a compensation parameter according to an output signal of an analog module on a transmission channel to be processed by the transmitter and an input signal of a digital module on each transmission channel among all transmission channels of the transmitter; generates a cancellation signal according to the compensation parameter and an input or output signal of a digital module on another transmission channel except for the transmission channel to be processed; and performs, according to the cancellation signal, interference elimination processing on the transmission channel to be processed. The cancellation signal is used to eliminate an interference signal among transmission channels, thereby avoiding an increase of a transmitter product size caused by an increase of a space size and arrangement of physical isolation elements among transmission channels; and in addition, the cancellation signal can be generated according to an actual signal status of each transmission channel, which improves an effect of eliminating interference among transmission channels.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
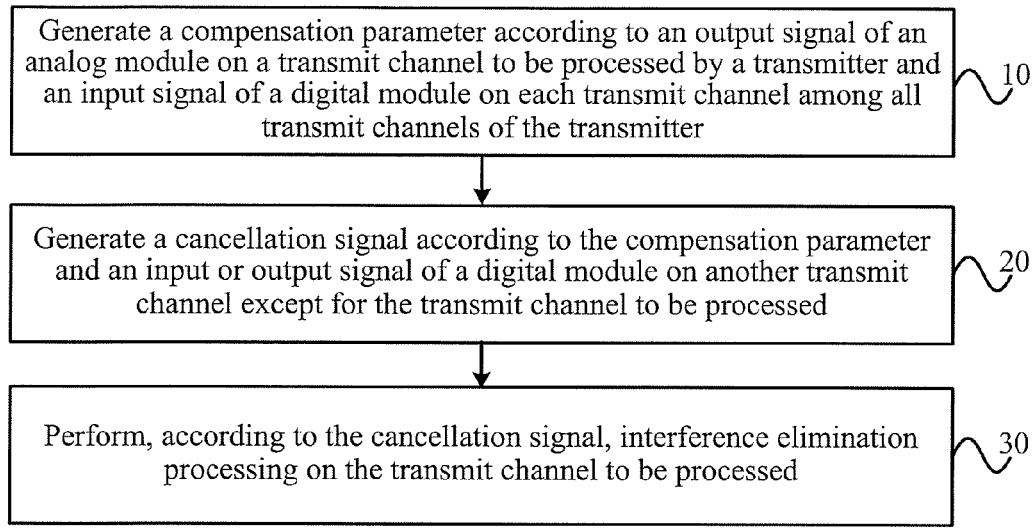
FIG. 1 is a flowchart of a method for eliminating interference among transmission channels of a transmitter according to an embodiment of the present invention.
Figure 2:
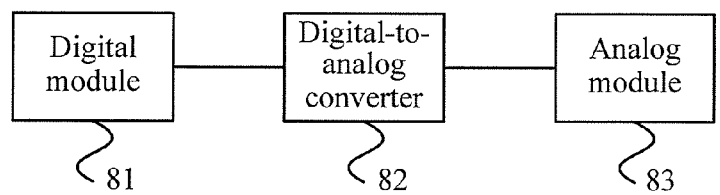
FIG. 2 is a schematic structural diagram of a transmission channel of a transmitter according to an embodiment of the present invention.

FIG. 1 is a flowchart of a method for eliminating interference among transmission channels of a transmitter according to an embodiment of the present invention. As shown in FIG. 1, the method for eliminating interference among transmission channels of a transmitter according to this embodiment can be specifically used to eliminate interference among transmission channels of a transmitter in a wireless communications system, where at least two transmission channels are arranged in the transmitter. A structure of each transmission channel may be shown in FIG. 2; the transmission channel includes a digital module 81, a digital-to-analog converter 82, and an analog module 83, where the digital module 81 and the analog module 83 are connected through the digital-to-analog converter 82. The digital module 81 includes a digital element such as a pre-distortion (pre-distortion, PD for short) submodule, and the analog module 83 includes an analog element such as a power amplifier. The method for eliminating interference among transmission channels of a transmitter according to this embodiment may be executed by an apparatus for eliminating interference among transmission channels of a transmitter.

The method for eliminating interference among transmission channels of a transmitter according to this embodiment specifically includes:

Step 10: Generate a compensation parameter according to an output signal of an analog module on a transmission channel to be processed by the transmitter and an input signal of a digital module on each transmission channel among all transmission channels of the transmitter.

Step 20: Generate a cancellation signal according to the compensation parameter and an input or output signal of a digital module on another transmission channel except for the transmission channel to be processed.

Step 30: Perform, according to the cancellation signal, interference elimination processing on the transmission channel to be processed.

Specifically, each transmission channel of the transmitter is used to process data into a transmit signal that can be transmitted wirelessly and then transmit the transmit signal. Signals on the transmission channels, especially analog signals in analog modules on the transmission channels, interfere with each other. Each transmission channel of the transmitter is processed in the same manner; therefore, for the ease of description, the following describes a process of eliminating interference of one transmission channel of the transmitter, where the transmission channel is the transmission channel to be processed.

The output signal of the analog module on the transmission channel to be processed may be, for example, an analog signal output by the power amplifier. Interference of a signal on another transmission channel to a signal on the transmission channel to be processed may be determined according to an input signal of the digital module and the output signal of the analog module on the transmission channel to be processed, and an input signal of a digital module on the another transmission channel. Therefore, the compensation parameter is determined. A cancellation signal is obtained according to the compensation parameter and an input signal of a digital module or an output signal of the digital module on another transmission channel except for the transmission channel to be processed. The cancellation signal is specifically used to eliminate an interference signal, which is generated by the signal on the other transmission channel, to the transmission channel to be processed; and therefore, by sending the cancellation signal to the transmission channel to be processed and processing the input cancellation signal by the analog module to generate a signal, the interference signal can be canceled.

In a method for eliminating interference among transmission channels of a transmitter according to this embodiment, an apparatus for eliminating interference among transmission channels of a transmitter generates a compensation parameter according to an output signal of an analog module on a transmission channel to be processed by the transmitter and an input signal of a digital module on each transmission channel among all transmission channels of the transmitter; generates a cancellation signal according to the compensation parameter and an input or output signal of a digital module on another transmission channel except for the transmission channel to be processed; and performs, according to the cancellation signal, interference elimination processing on the transmission channel to be processed. The cancellation signal is used to eliminate an interference signal among transmission channels, thereby avoiding an increase of a transmitter product size caused by an increase of a space size and arrangement of physical isolation elements among transmission channels; and in addition, the cancellation signal can be generated according to an actual signal status of each transmission channel, which improves an effect of eliminating interference among transmission channels.

In this embodiment, in step 10, the generating a compensation parameter according to an output signal of an analog module on a transmission channel to be processed by the transmitter and an input signal of a digital module on each transmission channel among all transmission channels of the transmitter may specifically be:

performing analog-to-digital conversion on the output signal of the analog module on the transmission channel to be processed, generating an injected signal according to the analog-to-digital converted signal and input signals of digital modules on the all transmission channels, and generating the compensation parameter according to the input signal of the digital module on each transmission channel among the all transmission channels and the injected signal; and after the generating the injected signal according to the analog-to-digital converted signal and input signals of digital modules on the all transmission channels, the method may further include:

inputting the injected signal to a training sequence pre-constructing submodule of the digital module on the transmission channel to be processed.

Specifically, the output signal of the analog module on the transmission channel to be processed is an analog signal, and the input signal of the digital module on each transmission channel is a digital signal; therefore, the analog-to-digital conversion may be first performed on the analog signal, so as to facilitate unified processing. The injected signal is generated according to the analog-to-digital converted signal and the input signals of the digital modules on the all transmission channels, and the injected signal is sent to the training sequence pre-constructing submodule on the transmission channel to be processed, where the training sequence pre-constructing submodule is specifically coupled in a pre-distortion submodule in the digital module, so that the training sequence pre-constructing submodule can perform pre-distortion processing on the input signal according to the injected signal. In addition, the compensation parameter is generated according to the injected signal; that is, the compensation parameter is estimated by using a parameter injection method, which can improve accuracy of the compensation parameter, and further improve stability of compensation.

In an actual application process, a channel model can be trained by using a specific training method. For example, in an implementation manner, the injected signal is X:

$$X = \begin{pmatrix} x_1 \\ x_2 \\ \ldots \\ x_N \end{pmatrix};$$

where N is the number of the transmission channels in the transmitter, and each element in X indicates an injected signal of each transmission channel. If the compensation parameter is estimated by using a blind parameter method, the X may be the input signal of the digital module on each transmission channel.

A feedback signal is Y:

$$Y = \begin{pmatrix} y_1 \\ y_2 \\ \dots \\ y_N \end{pmatrix};$$

and XH=Y, where H is a system matrix;

$$H^{-1} = (X^H Y)^{-1} \cdot (X^H X);$$

To simplify a calculation process, when test signals of the transmission channels are orthogonal, $$XX^H = \begin{bmatrix} \sigma_1^2 & 0 & \dots & 0 \\ 0 & \sigma_2^2 & \dots & 0 \\ \dots & \dots & \dots & \dots \\ 0 & 0 & \dots & \sigma_N^2 \end{bmatrix};$$

where σ is the compensation parameter.

The compensation parameter also includes information about an isolation degree; that is, the isolation degree among transmission channels can be obtained while the compensation parameter is estimated, and it is unnecessary to perform an isolation degree test by connecting a module to an external instrument, which improves efficiency of the isolation degree test.

In this embodiment, in step 30, the performing, according to the cancellation signal, interference elimination processing on the transmission channel to be processed may specifically be:

combining an output signal of a digital module on the transmission channel to be processed and the cancellation signal, and then sending the combined signal to a digital-to-analog converter on the transmission channel to be processed.

Specifically, in an implementation manner, the output signal of the digital module on the transmission channel to be processed may be processed according to the cancellation signal, and then send to the digital-to-analog converter for digital-to-analog conversion. The processing process may specifically be: if the signal obtained after the generated cancellation signal is processed by the analog module is a signal the same as the interference signal, the cancellation signal may be subtracted from the output signal of the digital module. Phase inversion processing may be performed on the cancellation signal when the cancellation signal is generated, and then the phase-inverted cancellation signal may be added to the output signal of the digital module.

In this embodiment, in step 30, the performing, according to the cancellation signal, interference elimination processing on the transmission channel to be processed may specifically be:

combining an input signal of a digital module on the transmission channel to be processed and the cancellation signal, and then sending the combined signals to the digital module on the transmission channel to be processed.

Specifically, in another implementation manner, the input signal of the digital module on the transmission channel to be processed may be processed according to the cancellation signal, and then the processed input signal may be input to the digital module. This processing process is similar to the processing process in the foregoing implementation manner, and is not repeated herein.

Figure 3:
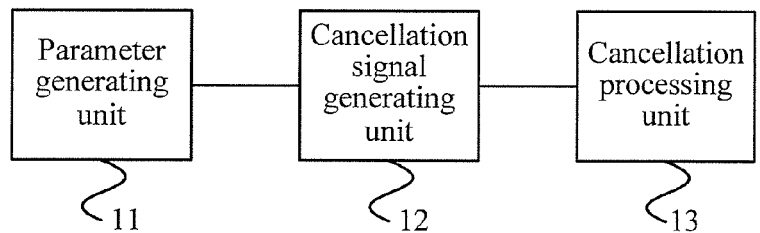
FIG. 3 is a schematic structural diagram of an apparatus for eliminating interference among transmission channels of a transmitter according to an embodiment of the present invention.

FIG. 3 is a schematic structural diagram of an apparatus for eliminating interference among transmission channels of a transmitter according to an embodiment of the present invention. As shown in FIG. 3, the apparatus for eliminating interference among transmission channels of a transmitter according to this embodiment can specifically implement each step of the method for eliminating interference among transmission channels of a transmitter according to any embodiment of the present invention, and a specific implementation process is not repeated herein. The apparatus for eliminating interference among transmission channels of a transmitter according to this embodiment includes a parameter generating unit 11, a cancellation signal generating unit 12, and a cancellation processing unit 13. The parameter generating unit 11 is configured to generate a compensation parameter according to an output signal of an analog module 83 on a transmission channel to be processed by the transmitter and an input signal of a digital module 81 of each transmission channel among all transmission channels of the transmitter. The cancellation signal generating unit 12 is connected to the parameter generating unit 11, and is configured to generate a cancellation signal according to the compensation parameter and an input or output signal of a digital module 81 on another transmission channel except for the transmission channel to be processed. The cancellation processing unit 13 is connected to the cancellation signal generating unit 12, and is configured to perform, according to the cancellation signal, interference elimination processing on the transmission channel to be processed.

Figure 4:
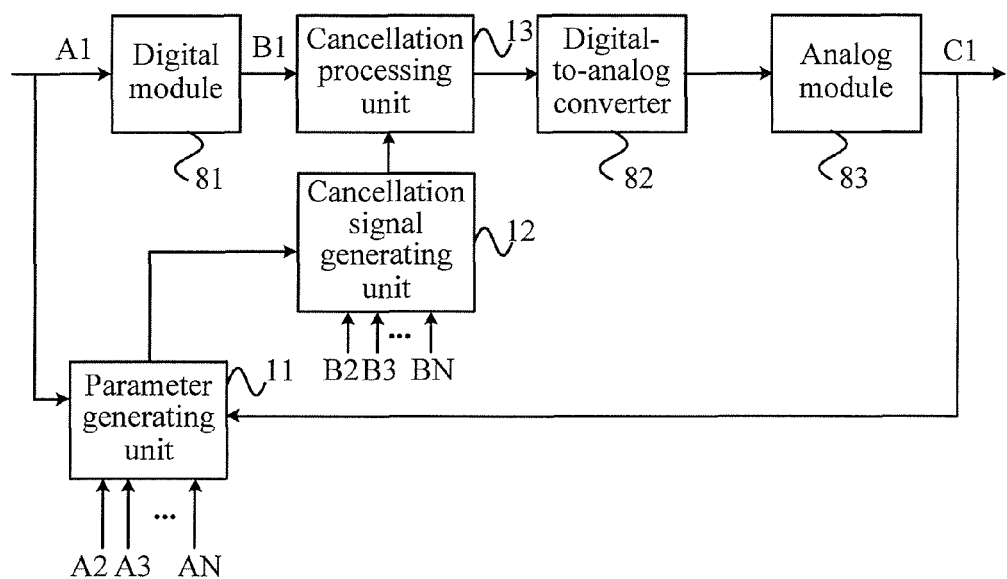
FIG. 4 is a schematic structural diagram of a first transmission channel correction system according to an embodiment of the present invention.

FIG. 4 is a schematic structural diagram of a first transmission channel correction system according to an embodiment of the present invention. With reference to FIG. 4, the following describes a process in which an apparatus for eliminating interference among transmission channels of a transmitter according to this embodiment corrects a transmission channel.

It is assumed that N transmission channels are arranged in the transmitter, where N≥2; the N transmission channels are respectively a first transmission channel, a second transmission channel . . . and an $N^{th}$ transmission channel. Input signals of digital modules 81 of the transmission channels are respectively A1, A2, . . . , and AN, output signals of the digital modules 81 of the transmission channels are respectively B1, B2, . . . , and BN, and output signals of analog modules 83 of the transmission channels are respectively C1, C2, . . . , and CN.

Using the first transmission channel being a transmission channel to be processed as an example, the parameter generating unit 11 generates a compensation parameter according to the output signal C1 of the analog module 83 on the first transmission channel and the input signals A1 to AN of the digital modules 81 on the first transmission channel to the $N^{th}$ transmission channel. The cancellation signal generating unit 12 generates a cancellation signal according to the compensation parameter generated by the parameter generating unit 11 and the output signals B2 to BN of the digital modules 81 on the second transmission channel to the $N^{th}$ transmission channel. The cancellation processing unit 13 performs interference elimination processing on the first transmission channel according to the cancellation signal. In the embodiment shown in FIG. 4, the cancellation processing unit 13 is connected between the digital module 81 and the digital-to-analog converter 82 of the first transmission channel, and the cancellation processing unit 13 processes, by using the cancellation signal, the output signal of the digital module 81 on the first transmission channel and then inputs the processed output signal to the digital-to-analog converter 82.

It is noteworthy that, FIG. 4 only shows a specific implementation manner, but the present invention is not limited thereto. The cancellation signal generating unit 12 of the apparatus for eliminating interference among transmission channels of a transmitter can further generate the cancellation signal according to the compensation parameter and the input signals A2 to AN of the digital modules 81 on the second transmission channel to the $N^{th}$ transmission channel. The cancellation processing unit 13 may also be arranged at an upper level of the digital module 81 of the first transmission channel; that is, the cancellation processing unit 13 may process, by using the cancellation signal, the input signal of the digital module 81 and then send the processed input signal to the digital module 81.

In an apparatus for eliminating interference among transmission channels of a transmitter according to this embodiment, a parameter generating unit 11 generates a compensation parameter according to an output signal of an analog module 83 on a transmission channel to be processed by the transmitter and an input signal of a digital module 81 on each transmission channel among all transmission channels of the transmitter; the cancellation signal generating unit 12 generates a cancellation signal according to the compensation parameter and an input or output signal of the digital module 81 on another transmission channel except for the transmission channel to be processed; and a cancellation processing unit 13 performs, according to the cancellation signal, interference elimination processing on the transmission channel to be processed. The cancellation signal is used to eliminate an interference signal among transmission channels, thereby avoiding an increase of a transmitter product size caused by an increase of a space size and arrangement of physical isolation elements among transmission channels; and in addition, the cancellation signal can be generated according to an actual signal status of each transmission channel, which improves an effect of eliminating interference among transmission channels.

In an actual implementation process, the parameter generating unit 11 and the cancellation signal generating unit 12 may be implemented by using hardware such as an FPGA (Field-Programmable Gate Array, field-programmable gate array), an ASIC (Application Specific Integrated Circuit, application specific integrated circuit), or a DSP (Digital Signal Processor, digital signal processor). A separate apparatus for eliminating interference among transmission channels may be arranged for each transmission channel, where the parameter generating unit 11 and the cancellation signal generating unit 12 in each apparatus for eliminating interference among transmission channels may also be integrated, and a specific implementation form thereof is not limited to this embodiment.

In this embodiment, the parameter generating unit 11 is specifically configured to perform analog-to-digital conversion on the output signal of the analog module 83 on the transmission channel to be processed, generate an injected signal according to the analog-to-digital converted signal and the input signal of digital modules 81 of the all transmission channels, generate the compensation parameter according to the input signal of the digital module 81 on each transmission channel among the all transmission channels and the injected signal, and input the injected signal to a training sequence pre-constructing submodule of the digital module 81 on the transmission channel to be processed.

Figure 5:
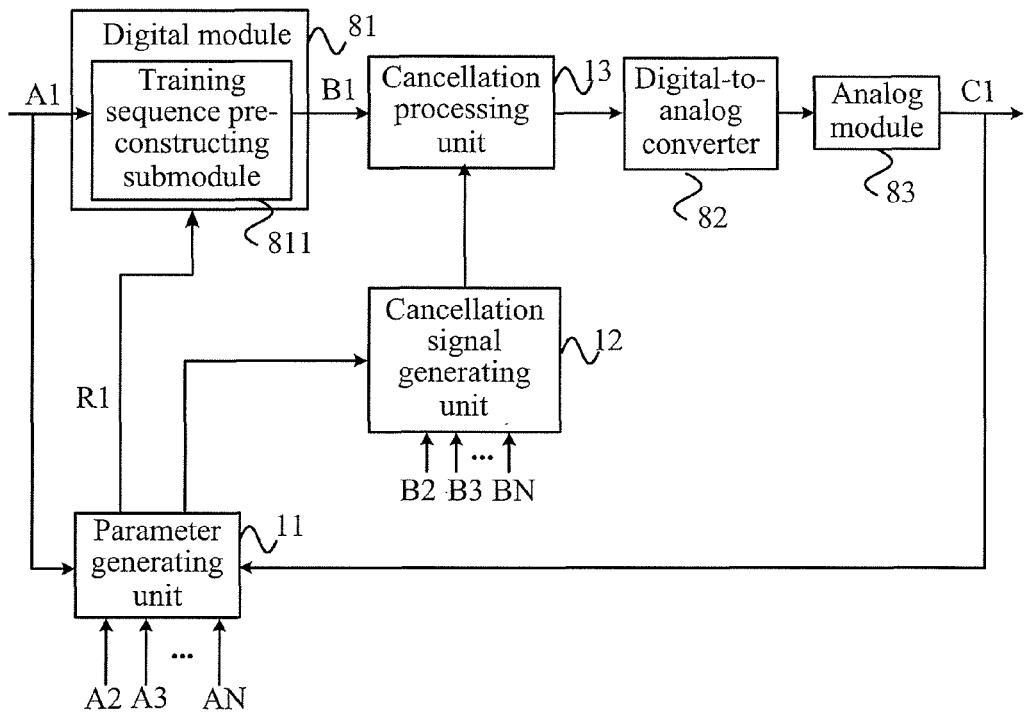
FIG. 5 is a schematic structural diagram of a second transmission channel correction system according to an embodiment of the present invention.

FIG. 5 is a schematic structural diagram of a second transmission channel correction system according to an embodiment of the present invention. With reference to FIG. 5, the following describes a process in which an apparatus for eliminating interference among transmission channels of a transmitter according to this embodiment corrects a transmission channel.

It is assumed that N transmission channels are arranged in the transmitter, where N≥2; the N transmission channels are respectively a first transmission channel, a second transmission channel . . . , and an $N^{th}$ transmission channel. Input signals of digital modules 81 of the transmission channels are respectively A1, A2, . . . , and AN, output signals of the digital modules 81 of the transmission channels are respectively B1, B2, . . . , and BN, and output signals of analog modules 83 of the transmission channels are respectively C1, C2, . . . , and CN.

Using the first transmission channel being a transmission channel to be processed as an example, the parameter generating unit 11 performs analog-to-digital conversion on the output signal C1 of the analog module 83 on the first transmission channel, generates an injected signal R1 according to the analog-to-digital converted signal and the input signals A1 to AN of the digital modules 81 on the first transmission channel to the $N^{th}$ transmission channel, sends the injected signal R1 to a training sequence pre-constructing submodule 811 on the digital module 81 of the first transmission channel, and generates a compensation parameter according to the injected signal R1 and the input signals A1 to AN of the digital modules 81 on the first transmission channel to the $N^{th}$ transmission channel. The cancellation signal generating unit 12 generates a cancellation signal according to the compensation parameter generated by the parameter generating unit 11 and the output signals B2 to BN of the digital modules 81 on the second transmission channel to the $N^{th}$ transmission channel. The cancellation processing unit 13 performs interference elimination processing on the first transmission channel according to the cancellation signal.

In this embodiment, the cancellation processing unit is specifically configured to combine an output signal of a digital module on the transmission channel to be processed and the cancellation signal, and then send the combined signals to a digital-to-analog converter on the transmission channel to be processed.

In this embodiment, the cancellation processing unit is specifically configured to combine an input signal of a digital module on the transmission channel to be processed and the cancellation signal, and then send the combined signals to the digital module on the transmission channel to be processed.

In this embodiment, the parameter generating unit includes a parameter generating subunit and a feedback signal collecting subunit; the feedback signal collecting subunit includes a coupled circuit and an analog-to-digital converter, and an output end of the analog module on the transmission channel is connected to the parameter generating subunit through the coupled circuit and the analog-to-digital converter.

In this embodiment, the cancellation processing unit includes an adder, and the adder respectively connected to an output end of the digital module on the transmission channel, an output end of the cancellation signal generating unit, and an input end of the digital-to-analog converter.

Figure 6:
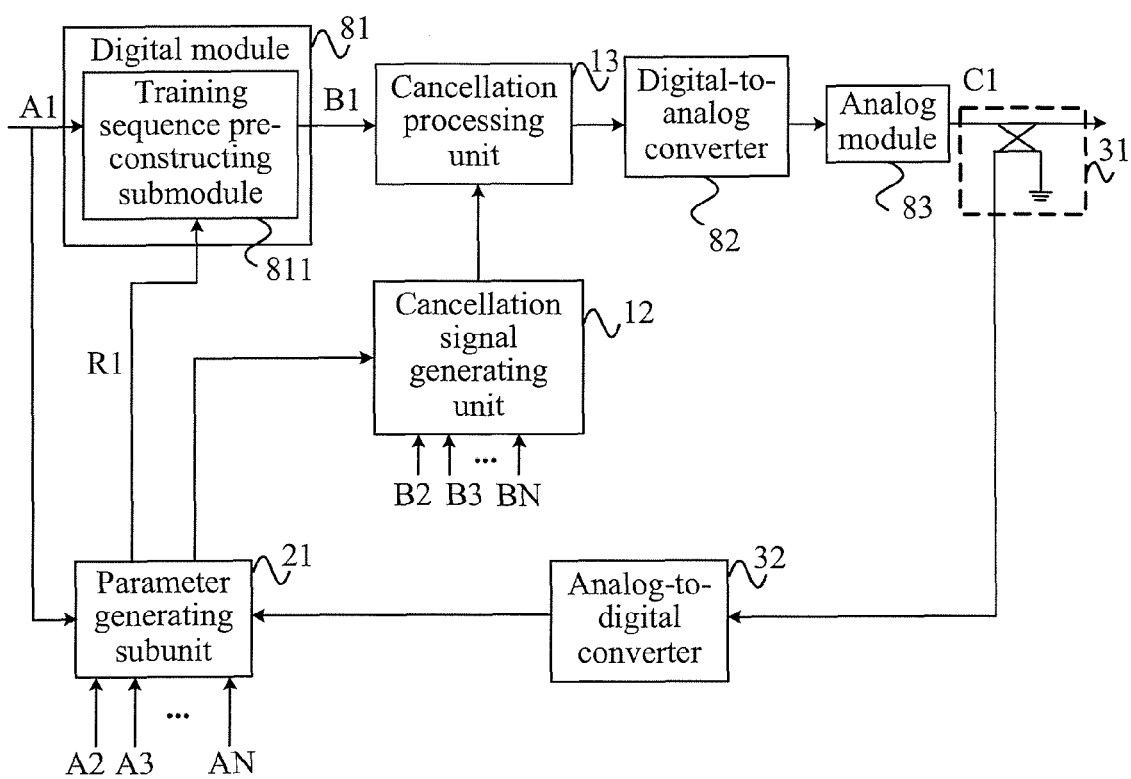
FIG. 6 is a schematic structural diagram of a third transmission channel correction system according to an embodiment of the present invention.

FIG. 6 is a schematic structural diagram of a third transmission channel correction system according to an embodiment of the present invention. With reference to FIG. 6, the following describes a process in which an apparatus for eliminating interference among transmission channels of a transmitter according to this embodiment corrects a transmission channel.

It is assumed that N transmission channels are arranged in the transmitter, where N≥2; the N transmission channels are respectively a first transmission channel, a second transmission channel . . . , and an $N^{th}$ transmission channel. Input signals of digital modules 81 of the transmission channels are respectively A1, A2, . . . , and AN, output signals of the digital modules 81 of the transmission channels are respectively B1, B2, . . . , and BN, and output signals of analog modules 83 of the transmission channels are respectively C1, C2, . . . , and CN.

Using the first transmission channel being a transmission channel to be processed as an example, a coupled circuit 31 collects the output signal C1 of the analog module 83 on the first transmission channel; an analog-to-digital converter 32 performs analog-to-digital conversion on the output signal C1 and then sends the output signal. C1 to the parameter generating subunit; the parameter generating subunit generates an injected signal R1 according to the analog-to-digital converted signal and the input signals A1 to AN of the digital modules 81 on the first transmission channel to the $N^{th}$ transmission channel, sends the injected signal R1 to a training sequence pre-constructing submodule 811 on the digital module 81 on the first transmission channel, and generates a compensation parameter according to the injected signal R1 and the input signals A1 to AN of the digital modules 81 on the first transmission channel to the $N^{th}$ transmission channel. The cancellation signal generating unit 12 generates a cancellation signal according to the compensation parameter generated by the parameter generating unit and the output signals B2 to BN of the digital modules 81 on the second transmission channel to the $N^{th}$ transmission channel, and then sends the cancellation signal to an adder that is connected between the digital module 81 and the digital-to-analog converter 82 on the first transmission channel, so as to implement interference elimination processing on the first transmission channel.

In this embodiment, the cancellation processing unit is the adder, and the adder connects to an input end of the digital module on the transmission channel.

Figure 7:
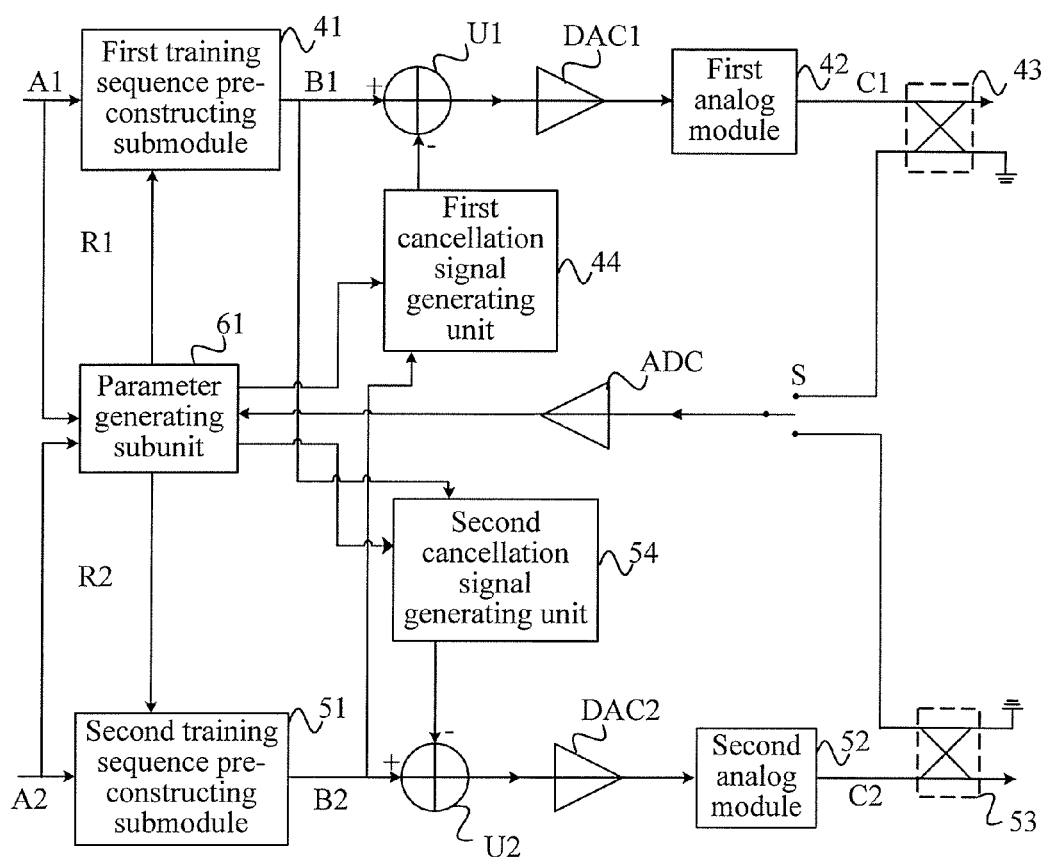
FIG. 7 is a schematic structural diagram of a fourth transmission channel correction system according to an embodiment of the present invention.

FIG. 7 is a schematic structural diagram of a fourth transmission channel correction system according to an embodiment of the present invention. With reference to FIG. 7, the following describes a process in which an apparatus for eliminating interference among transmission channels of a transmitter according to this embodiment corrects a transmission channel.

Two transmission channels are arranged in the transmitter, which are respectively a first transmission channel and a second transmission channel. The first transmission channel includes a first digital module, a first digital-to-analog converter DAC1, and a first analog module 42; the first digital module includes a first training sequence pre-constructing submodule 41. An input signal of the first digital module is A1, an output signal of the first digital module is B1, and an output signal of the first analog module 42 is C1. The second transmission channel includes a second digital module, a second digital-to-analog converter DAC2, and a second analog module 52; the second digital module includes a second training sequence pre-constructing submodule 51. An input signal of the second digital module is A2, an output signal of the second digital module is B2, and an output signal of the second analog module 52 is C2.

The apparatus for eliminating interference among transmission channels of a transmitter includes a parameter generating subunit 61, a first coupled circuit 43, a second coupled circuit 53, a switch S, an analog-to-digital converter ADC, a first cancellation signal generating unit 44, a second cancellation signal generating unit 54, a first adder U1, and a second adder U2. The first coupled circuit 43 or the second coupled circuit 53 may be electrically connected to the analog-to-digital converter ADC under the control of the switch S.

For the first transmission channel, the first coupled circuit 43 collects the output signal C1 of the first analog module 42 of the first transmission channel, and the analog-to-digital converter ADC performs analog-to-digital conversion on the output signal C1 and then sends the analog-to-digital converted signal to the parameter generating subunit 61; and the parameter generating subunit 61 generates an injected signal R1 according to the analog-to-digital converted signal, the input signal A1 of the first digital module on the first transmission channel, and the input signal A2 of the second digital module on the second transmission channel, sends the injected signal R1 to the first training sequence pre-constructing submodule 41 on the first transmission channel, and generates a compensation parameter according to the injected signal R1, the input signal A1 of the first digital module on the first transmission channel, and the input signal A2 of the second digital module on the second transmission channel. The first cancellation signal generating unit 44 generates a cancellation signal according to the compensation parameter generated by the parameter generating subunit 61 and the output signal B2 of the second digital module on the second transmission channel, and then sends the cancellation signal to the first adder U1 that is connected between the first digital module and the first digital-to-analog converter DAC1 of the first transmission channel, so as to implement interference elimination processing on the first transmission channel.

For the second transmission channel, the second coupled circuit 53 collects the output signal C2 of the second analog module on the second transmission channel; the analog-to-digital converter ADC performs analog-to-digital conversion on the output signal C2 and then sends the analog-to-digital converted signal to the parameter generating subunit 61; and the parameter generating subunit 61 generates an injected signal R2 according to the analog-to-digital converted signal, the input signal A1 of the first digital module on the first transmission channel, and the input signal A2 of the second digital module on the second transmission channel, sends the injected signal R2 to a second training sequence pre-constructing submodule 51 on the second transmission channel, and generates the compensation parameter according to the injected signal R2, the input signal A1 of the first digital module on the first transmission channel, and the input signal A2 of the second digital module on the second transmission channel. The second cancellation signal generating unit 54 generates a cancellation signal according to the compensation parameter generated by the parameter generating subunit 61 and the output signal B1 of the first digital module on the first transmission channel, and then sends the cancellation signal to the second adder U2 that is connected between the second digital module and the second digital-to-analog converter DAC2 of the second transmission channel, so as to implement interference elimination processing on the second transmission channel.

Persons of ordinary skill in the art may understand that, all or a part of the processes of the foregoing method embodiments may be implemented by a computer program instructing relevant hardware. The foregoing program may be stored in a computer readable storage medium. When the program runs, the steps of the foregoing method embodiments are performed. The foregoing storage medium may include any mediums capable of storing program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause corresponding technical solutions to depart from the scope of the technical solutions of the embodiments of the present invention.

What is claimed is:

1. A method for eliminating interference among transmission channels of a transmitter, comprising:
    generating a compensation parameter according to an output signal of an analog module on a transmission channel to be processed of the transmitter and an input signal of a digital module on each of all transmission channels of the transmitter;
    generating a cancellation signal according to the compensation parameter and an input or output signal of a digital module on another transmission channel except for the transmission channel to be processed; and
    performing, according to the cancellation signal, interference elimination processing on the transmission channel to be processed.

2. The method for eliminating interference among the transmission channels of the transmitter according to claim 1, wherein generating the compensation parameter comprises:
    performing analog-to-digital conversion on the output signal of the analog module on the transmission channel to be processed, generating an injected signal according to the analog-to-digital converted signal and input signals of digital modules on the all transmission channels, and generating the compensation parameter according to the injected signal; and
    after generating the injected signal according to the analog-to-digital converted signal and input signals of digital modules on the all transmission channels, the method further comprises:
    inputting the injected signal to a training sequence pre-constructing submodule of a digital module on the transmission channel to be processed.

3. The method for eliminating interference among the transmission channels of the transmitter according to claim 1, wherein performing the interference elimination processing on the transmission channel to be processed comprises:
    combining an output signal of a digital module on the transmission channel to be processed and the cancellation signal, and sending the combined signal to a digital-to-analog converter on the transmission channel to be processed.

4. The method for eliminating interference among the transmission channels of the transmitter according to claim 1, wherein performing the interference elimination processing on the transmission channel to be processed comprises:
    combining an input signal of a digital module on the transmission channel to be processed and the cancellation signal, and sending the combined signal to the digital module on the transmission channel to be processed.

5. An apparatus for eliminating interference among transmission channels of a transmitter, comprising:
    a processor; and
    memory coupled to the processor, the memory comprising instructions that, when executed by the processor, cause the apparatus to:
    generate a compensation parameter according to an output signal of an analog module on a transmission channel to be processed of the transmitter and an input signal of a digital module on each of all transmission channels of the transmitter;
    generate a cancellation signal according to the compensation parameter and an input or output signal of a digital module on another transmission channel except for the transmission channel to be processed; and
    perform, according to the cancellation signal, interference elimination processing on the transmission channel to be processed.

6. The apparatus for eliminating interference among the transmission channels of the transmitter according to claim 5, further comprising instructions that, when executed by the processor, cause the apparatus to:
    perform analog-to-digital conversion on the output signal of the analog module on the transmission channel to be processed, generate an injected signal according to the analog-to-digital converted signal and input signals of digital modules on the all transmission channels, generate the compensation parameter according to the injected signal, and input the injected signal to a training sequence pre-constructing submodule of a digital module on the transmission channel to be processed.

7. The apparatus for eliminating interference among the transmission channels of the transmitter according to claim 5, further comprising instructions that, when executed by the processor, cause the apparatus to combine an output signal of a digital module on the transmission channel to be processed and the cancellation signal, and send the combined signal to a digital-to-analog converter on the transmission channel to be processed.

8. The apparatus for eliminating interference among the transmission channels of the transmitter according to claim 5, further comprising instructions that, when executed by the processor, cause the apparatus to combine an input signal of a digital module on the transmission channel to be processed and the cancellation signal, and send the combined signal to the digital module on the transmission channel to be processed.

9. The apparatus for eliminating interference among the transmission channels of the transmitter according to claim 5, further comprising
    a coupled circuit and an analog-to-digital converter coupled to the processor, and an output end of the analog module on the transmission channel to be processed is coupled to the coupled circuit and the analog-to-digital converter; and
    the memory further comprising instructions that, when executed by the processor, cause the apparatus to:
    generate an injected signal according to the analog-to-digital converted signal that is output by the analog-to-digital converter and input signals of digital modules on the all transmission channels, generate the compensation parameter according to the input signal of the digital module on each transmission channel among the all transmission channels and the injected signal, and input the injected signal to a training sequence pre-constructing submodule of the digital module on the transmission channel to be processed.

10. The apparatus for eliminating interference among the transmission channels of the transmitter according to claim 7, further comprising an adder, and the adder is coupled to an output end of the digital module on the transmission channel to be processed and an input end of the digital-to-analog converter on the transmission channel to be processed.

11. The apparatus for eliminating interference among the transmission channels of the transmitter according to claim 8, further comprising an adder, and the adder connects to an input end of the digital module on the transmission channel to be processed.

12. A transmitter, comprising;
transmission channels;
a processor; and
memory coupled to the processor, the memory comprising instructions that, when executed by the processor, cause the transmitter to:
generate a compensation parameter according to an output signal of an analog module on a transmission channel to be processed of the transmitter and an input signal of a digital module on each of all transmission channels of the transmitter;
generate a cancellation signal according to the compensation parameter and an input or output signal of a digital module on another transmission channel except for the transmission channel to be processed; and
perform, according to the cancellation signal, interference elimination processing on the transmission channel to be processed.

* * * * *